Figure 1:
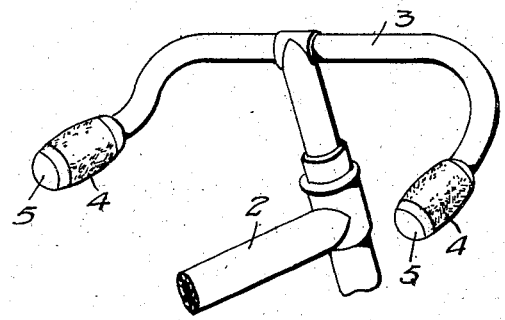

No. 702,763. Patented June 17, 1902.
P. A. AURNESS.
BICYCLE MIRROR.
(Application filed May 7, 1900.)

(No Model.) 2 Sheets—Sheet 1.

WITNESSES
E. G. Staune
M. E. Cooley

INVENTOR
PETER A. AURNESS
Paul D. Hawley
HIS ATTORNEYS

No. 702,763. Patented June 17, 1902.
P. A. AURNESS.
BICYCLE MIRROR.
(Application filed May 7, 1900.)

(No Model.) 2 Sheets—Sheet 2.

WITNESSES
INVENTOR
PETER A. AURNESS.
BY Paul O Hawley
HIS ATTORNEYS.

UNITED STATES PATENT OFFICE.

PETER A. AURNESS, OF MINNEAPOLIS, MINNESOTA.

BICYCLE-MIRROR.

SPECIFICATION forming part of Letters Patent No. 702,763, dated June 17, 1902.

Application filed May 7, 1900. Serial No. 15,672. (No model.)

*To all whom it may concern:*

Be it known that I, PETER A. AURNESS, of the city of Minneapolis, county of Hennepin, State of Minnesota, have invented certain new and useful Improvements in Bicycle-Mirrors, of which the following is a specification.

My invention relates to safety attachments for bicycles, and particularly to mirror attachments therefor. Accidents that result from head-end collisions are few as compared with the serious injuries that are sustained from rear-end collisions, which are occasioned by the neglect of riders to turn in the saddle and look behind before making a sudden stop in the road or before turning to one side oftentimes in front of a swiftly-approaching vehicle.

The object of this invention is to provide means that will enable the rider, while watching the path ahead of him, to readily and distinctly observe the approach of persons or vehicles from the rear. When a rider is informed of the proximity of a moving object and its direction, he may easily avoid a collision.

Another object of the invention is to provide a reflector or mirror for bicycles which will be inconspicuous and yet within easy range of vision while a rider is looking ahead.

My invention consists generally in the combination, with the handle-bar of a bicycle, of a mirror arranged upon the end of said bar to reflect the image of objects behind the bicycle.

Further, my invention consists in particular constructions and combinations of parts, all as hereinafter described, and particularly pointed out in the claims.

The invention will be more readily understood by reference to the accompanying drawings, in which—

Figure 2:
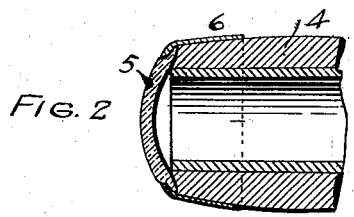
Figure 3:
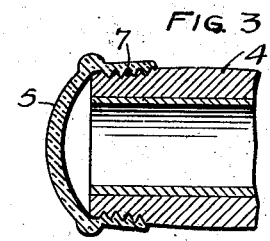
Figure 9:
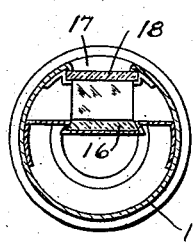
Figure 11:
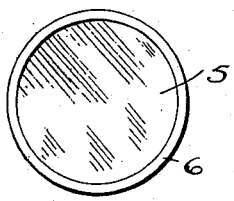
Figure 10:
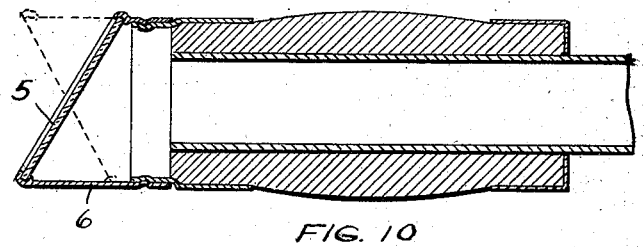
Figure 12:
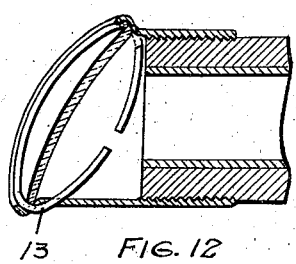

Figure 1 is a perspective view of a handle-bar provided with an arrangement embodying my invention. Fig. 2 is a sectional detail of one of the mirrors. Figs. 3, 4, 5, 6, and 7 are similar sectional views illustrating modified forms of the convex mirror. Fig. 8 is a sectional view of a bicycle-handle provided with still another form of reflecting device. Fig. 9 is a sectional view thereof on the line $x$ $x$ of Fig. 8. Fig. 10 illustrates an adjustable handle-mirror, the reflecting-surface of which is plain or but slightly convex. Fig. 11 is an end view of the same. Fig. 12 is a sectional view showing still another construction of the mirror holder or fastening.

The device is of a most simple character, comprising only the mirror and means for holding and attaching it to the end of the bicycle handle-bar. The range or command of view to rearward depends on the nature of the mirror that is used. A flat mirror gives command of but a limited field a short distance only to the rear; but the images or reflections upon the mirror will be very distinct. A mirror that is slightly convex will assist the vision to a wider field or view, and a very high degree of convexity will give command of all to the rear and upon the rearward quarters. Owing to the differing angles of handle-bars there is more need of adjustability of the mirror when a plain or a but slightly-convexed mirror is employed, and, in fact, I make only such mirrors adjustable. As shown in the drawings, the mirrors are arranged preferably on both ends of the bicycle handle-bar in order to reflect objects on both sides of the rider.

In Fig. 1, 2 represents the bicycle-frame, and 3 the handle-bar. 4 represents the handles. The mirrors 5 may be of glass or of metal. I prefer glass. The mirrors are attached to the ends of the handles by means of ferrules 6. Regardless of the position of the handle-bar, the convex mirrors always afford surfaces of coincidence between the lines of vision from the eye of the rider and the object to rearward.

Figure 4:
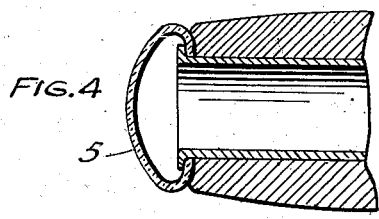
Figure 5:
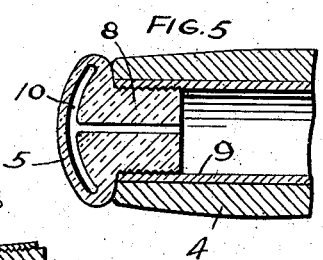
Figure 6:
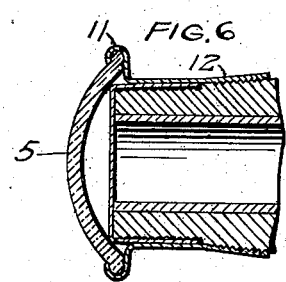

In place of a mirror of the construction shown in Fig. 2 I may make the mirror and the ferrule integral in glass, the ferrule portion being provided with screw-threads 7, that may be readily screwed onto the cork handle, or in place of securing the mirror upon the cork I may secure the same by means of the tubular handle-bar itself, as shown in Fig. 4 or as shown in Fig. 5, in which latter the mirror-piece is a practically solid block provided with a boss 8, that is screwed or cemented into the end of the tube 9. In this form of the device a chamber 10 is left within the glass block to receive the quicksilver, by which the reflecting-surface is made. Still another manner of securing the mirror is shown in Fig. 6. This is a preferred construction, as it permits the employment of a mirror of greater diameter than the end of the handle-bar. The large mirror 5 is held in the flange 11 of the screw-ferrule 12, that is screwed over the ordinary cap on the end of the handle 4. This form of the device admits of the arrangement of the mirror at an angle to the axis of the handle-bar, if desired.

Figure 7:
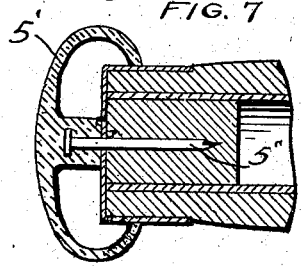
Figure 8:
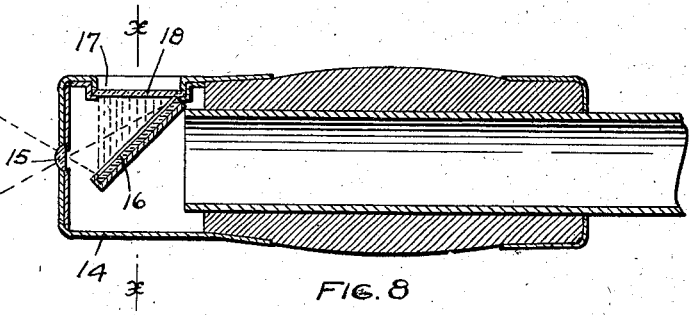

A large globular mirror 5', with an internal fastening 5", is illustrated in Fig. 7. The screw or nail 5" is preferably cast in the glass.

In Fig. 10 I have illustrated the form of the ferrule 6.

When a plain mirror is to be used or one of very slight convexity, the mirror is arranged at an angle to the axis of the handle-bar, and the ferrule may be turned on the handle-bar, so as to change the position of the mirror according to the angle of the handle-bar and the distance between the mirror and the eye of the rider.

In Fig. 12 I have shown a mirror-fastening which permits the removal of the mirror more readily than do some of the other fastenings, a detachable locking-ring 13 being used in the ferrule to secure the mirror.

A particularly-desirable form of my invention is shown in Figs. 8 and 9. In place of the ferrule hitherto described I here use a cap 14, provided with a small lens or a hole 15 in its end, through which the rays of light are concentrated upon a small mirror 16, provided within the cap. The image upon the mirror is visible through a hole 17 in the side of the cap or upon a ground glass 18, provided therein, after the manner of a photographic finder. I shall sometimes make the mirror 16 angularly adjustable within the cap and with relation to the ground-glass.

One of the chief advantages of my invention is the steadiness of the mirror when the bicycle is in motion. When the bicycle-handles are in the grasp of the rider, they vibrate less than any other part of the bicycle. A mirror that was elevated above the frame or attached to other parts thereof would be useless because of the rapidity of its vibration.

Having thus described my invention, I claim as new and desire to secure by Letters Patent—

1. The combination, with a bicycle handle-bar, of a mirror attached to the tip of the grip portion of said bar and included substantially within the circumference of the same.

2. The combination, with a bicycle handle-bar, of a mirror attachment on the end thereof and in continuation of the handle portion, substantially as described.

3. The combination, with a bicycle handle-bar, of a mirror adjustably arranged upon the end of said bar and forming a continuation of the handle portion thereof, as and for the purpose specified.

4. The combination, with a bicycle handle-bar, of a mirror arranged at the end of the grip portion at an angle to the axis thereof and forming a continuation of the handle portion, substantially as described.

5. The combination, with the bicycle handle-bar, of a convex mirror provided at the end of said bar and substantially concentric with the axis thereof, substantially as and for the purpose specified.

6. The combination, with a bicycle handle-bar, of a convex mirror provided upon the end thereof and angularly adjustable thereon, forming a continuation of the handle portion of said bar.

7. The combination, with a bicycle handle-bar, of a ferrule or fastening provided upon the tip end of the grip portion thereof, and a disk mirror provided in said ferrule and supported thereby on said grip portion substantially concentric with the axis thereof, substantially as described.

8. The combination, with a bicycle handle-bar, of a ferrule removably secured on the end of the grip portion thereof, and a convex mirror provided in said ferrule and removable therewith from said grip portion, substantially as described.

9. The combination, with a bicycle handle-bar, of a convex mirror removably secured to the tip of the grip portion thereof, substantially as described.

In testimony whereof I have hereunto set my hand, this 3d day of May, 1900, at Minneapolis, Minnesota.

PETER A. AURNESS.

In presence of—
C. G. HAWLEY,
M. C. GOOLEY.